(12) United States Patent
Mukhopadhyay et al.

(10) Patent No.: US 12,530,599 B2
(45) Date of Patent: Jan. 20, 2026

(54) ACCURACY OF MULTIVARIATE APPROACH FOR TIME-SERIES BASED FORECASTING

(71) Applicant: Juniper Networks, Inc., Sunnyvale, CA (US)

(72) Inventors: Sabyasachi Mukhopadhyay, Bangalore (IN); Rakshith N, Puttur (IN); Sanjeev Kumar Mishra, Bangalore (IN); Pooja Sambhaji Ayanile, Latur (IN); Darshan Tirumale Dhanaraj, Bangalore (IN); Subhabrata Banerjee, Bangalore (IN); Sarath Gollapudi, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 783 days.

(21) Appl. No.: 17/878,514

(22) Filed: Aug. 1, 2022

(65) Prior Publication Data
US 2024/0037419 A1 Feb. 1, 2024

(51) Int. Cl.
*G06N 5/022* (2023.01)

(52) U.S. Cl.
CPC .................... *G06N 5/022* (2013.01)

(58) Field of Classification Search
CPC ...................................... G06N 5/022
See application file for complete search history.

(56) References Cited

U.S. PATENT DOCUMENTS

| | | | |
|---|---|---|---|
| 2012/0150489 A1* | 6/2012 | Dhurandhar | G06F 17/18 702/179 |
| 2014/0201642 A1 | 7/2014 | Vicat-Blanc | |
| 2015/0256413 A1 | 9/2015 | Du et al. | |
| 2022/0036387 A1* | 2/2022 | Papadimitriou | G06N 20/20 |

OTHER PUBLICATIONS

Panda et al., Ensemble Methods for Improving Classifier Performance, Springer Nature Singapore Pte Ltd. 2018; pp. 363-374 (Year: 2018).*

(Continued)

*Primary Examiner* — Alan Chen
(74) *Attorney, Agent, or Firm* — Harrity & Harrity, LLP

(57) ABSTRACT

In some implementations, a monitoring device may obtain a plurality of time-series data streams respectively associated with a plurality of resources. The monitoring device may generate, using a plurality of machine learning models and based on the plurality of time-series data streams, a plurality of sets of multi-step forecast values, wherein each set of multi-step forecast values is associated with the plurality of resources. The monitoring device may determine, based on the plurality of sets of multi-step forecast values, a set of particular multi-step forecast values associated with the plurality of resources. The monitoring device may cause, based on the set of particular multi-step forecast values, one or more actions to be performed. In some implementations, the monitoring device may determine, based on the plurality of time-series data streams and the plurality of sets of multi-step forecast values, that a correlation exists between a first resource and a second resource.

20 Claims, 14 Drawing Sheets

(56) References Cited

OTHER PUBLICATIONS

Jin et al., Ensemble Deep Learning for Biomedical Time Series Classification, Hindawi Publishing Corporation; Computational Intelligence and Neuroscience; vol. 2016, Article ID 6212684, Total pp. 13; http://dx.doi.org/10.1155/2016/6212684 (Year: 2016).*

Allende et al., Ensemble Methods for Time Series Forecasting, Springer International Publishing AG; 2017; pp. 217-232 (Year: 2017).*

Extended European Search Report for Application No. EP22196628. 6, mailed on Jul. 25, 2023, 9 pages.

He Z., et al., "Ensemble Transfer CNNs Driven by Multi-channel Signals for Fault Diagnosis of Rotating Machinery Cross Working Conditions," Knowledge-Based Systems, Aug. 2020, vol. 207, pp. 106396, XP086266895, ISSN: 0950-7051, DOI: 10.1016/j.knosys. 2020.106396, [retrieved on Aug. 17, 2020].

Zhang S., et al., "A Novel Ensemble Deep Learning Model With Dynamic Error Correction and Multi-objective Ensemble Pruning for Time Series Forecasting," Information Sciences, Jan. 2021, vol. 544, pp. 427-445, XP086292176, ISSN:0020-0255, DOI:10.1016/j.ins.2020.08.053, [retrieved on Sep. 19, 2020].

Halil Ertan, "CNN-LSTM-Based Models for Multiple Parallel Input and Multi-Step Forecast" Nov. 17, 2021, Towards Data Science, https://towardsdatascience.com/cnn-lstm-based-models-for-multiple-parallel-input-and-multi-step-forecast-6fe217217668.

Daniel Herkert, "Multivariate Time Series Forecasting with Deep Learning", Jan. 7, 2022, Towards Data Science, https://towardsdatascience.com/multivariate-time-series-forecasting-with-deep-learning-3e7b3e2d2bcf.

Jason Brownlee, "Multivariate Time Series Forecasting with LSTMs in Keras", Aug. 14, 2017, Deep Learning for Time Series, https://machinelearningmastery.com/multivariate-time-series-forecasting-lstms-keras/.

Harya Widiputra, et al.; "Multivariate CNN-LSTM Model for Multiple Parallel Financial Time-Series Prediction", Complexity in Economics and Business 2021; vol. 2021; Oct. 23, 2021; https://www.hindawi.com/journals/complexity/2021/9903518/.

Extended European Search Report for Application No. EP22194654. 4, mailed on Dec. 23, 2022, 10 pages.

* cited by examiner

ACCURACY OF MULTIVARIATE APPROACH FOR TIME-SERIES BASED FORECASTING

BACKGROUND

Time-series based forecasting is a technique for predicting future events by analyzing past trends, based on the assumption that future trends will be similar to historical trends. Often, forecasting involves using a machine learning model that processes historical data to predict future values.

SUMMARY

Some implementations described herein relate to a device. The device may include one or more memories and one or more processors. The device may be configured to obtain a plurality of time-series data streams respectively associated with a plurality of resources. The device may be configured to generate, using a first machine learning model and based on the plurality of time-series data streams, a set of first multi-step forecast values associated with the plurality of resources. The device may be configured to generate, using a second machine learning model and based on the plurality of time-series data streams, a set of second multi-step forecast values associated with the plurality of resources. The device may be configured to generate, using a third machine learning model and based on the plurality of time-series data streams, a set of third multi-step forecast values associated with the plurality of resources. The device may be configured to determine, based on the set of first multi-step forecast values, the set of second multi-step forecast values, and the set of third multi-step forecast values, a set of particular multi-step forecast values associated with the plurality of resources. The device may be configured to cause, based on the set of particular multi-step forecast values, one or more actions to be performed.

Some implementations described herein relate to a non-transitory computer-readable medium that stores a set of instructions for a device. The set of instructions, when executed by one or more processors of the device, may cause the device to obtain a plurality of time-series data streams respectively associated with a plurality of resources. The set of instructions, when executed by one or more processors of the device, may cause the device to generate, using three machine learning models and based on the plurality of time-series data streams, a set of first multi-step forecast values associated with the plurality of resources, a set of second multi-step forecast values associated with the plurality of resources, and a set of third multi-step forecast values associated with the plurality of resources. The set of instructions, when executed by one or more processors of the device, may cause the device to determine, based on the set of first multi-step forecast values, the set of second multi-step forecast values, and the set of third multi-step forecast values, a set of particular multi-step forecast values associated with the plurality of resources. The set of instructions, when executed by one or more processors of the device, may cause the device to cause, based on the set of particular multi-step forecast values, one or more actions to be performed.

Some implementations described herein relate to a method. The method may include obtaining a plurality of time-series data streams respectively associated with a plurality of resources. The method may include generating, using a plurality of machine learning models and based on the plurality of time-series data streams, a plurality of sets of multi-step forecast values, where each set of multi-step forecast values is associated with the plurality of resources. The method may include determining, based on the plurality of sets of multi-step forecast values, a set of particular multi-step forecast values associated with the plurality of resources. The method may include causing, based on the set of particular multi-step forecast values, one or more actions to be performed.

DETAILED DESCRIPTION

Figure 1A:
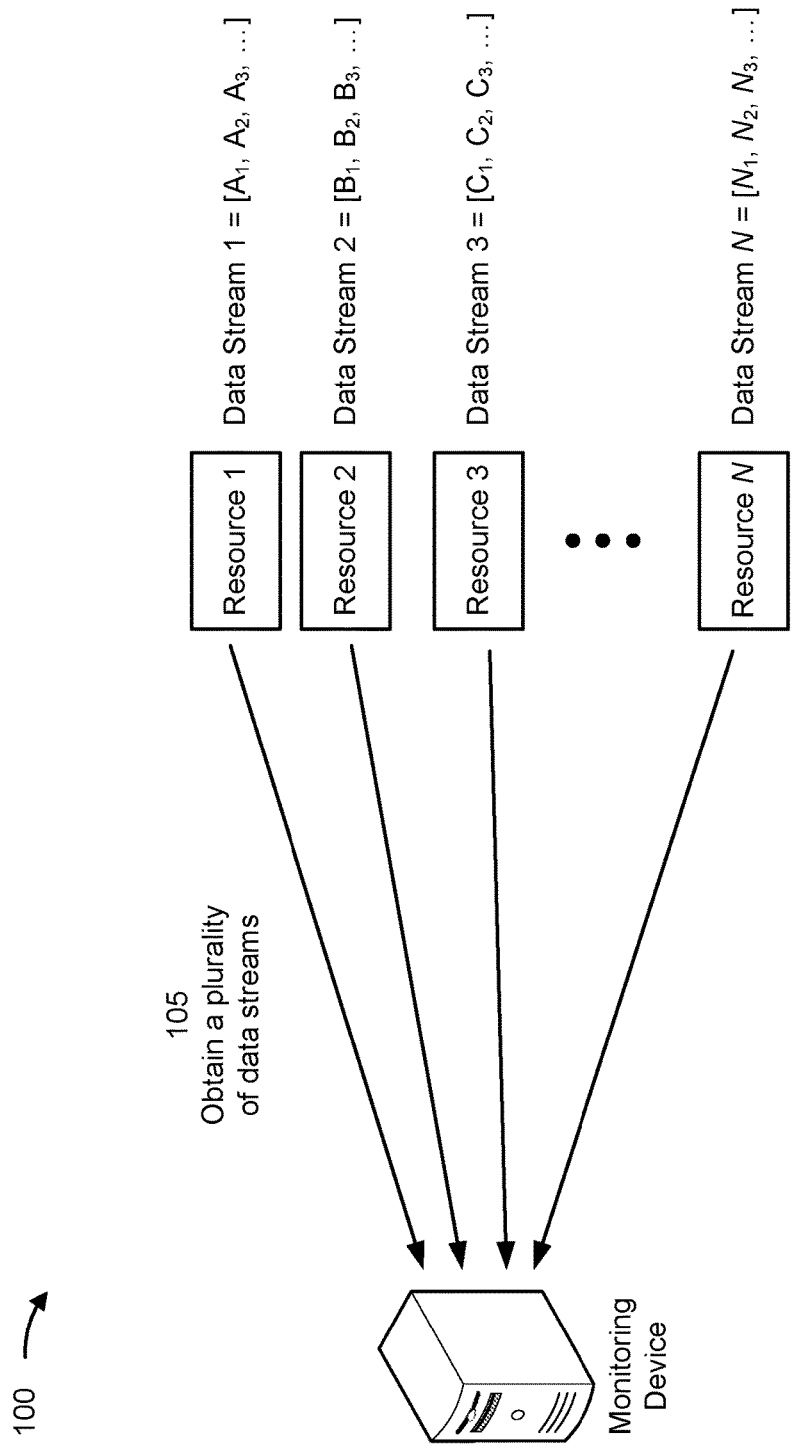
FIGS. 1A-1I are diagrams of one or more example implementations described herein.

The following detailed description of example implementations refers to the accompanying drawings. The same reference numbers in different drawings may identify the same or similar elements.

Time-series forecasting includes the complexity of order or temporal dependence between observed events. Traditionally, time-series forecasting may be performed using linear models, such as an autoregressive integrated moving average (ARIMA) model or an exponential smooth (ETS) model, because such model are lightweight and require less data to be trained as compared to other more complex models. However these models have limitations because they focus on complete data, assume a linear relationship between events, focus on univariate data, focus on fixed temporal dependence, and focus on one-step predictions. Further, some multivariate models can produce multi-step predictions, but can suffer from unseen or unnoticed characteristics that can impact an accuracy of the multi-step predictions. For example, the models may be configured to rely on features in a set of training data that are not present in real-world data, which can cause the models to incorporate spurious correlations.

Some implementations described herein provide a monitoring device that obtains a plurality of time-series data streams respectively associated with a plurality of resources. The monitoring device generates, using a plurality of machine learning models (e.g., three or more machine learning models, such as one or more convolutional neural network (CNN) models, recurrent neural network (RNN) models, and/or long short-term memory (LSTM) models) and based on the plurality of time-series data streams, a plurality of sets of multi-step forecast values (e.g., where each set of multi-step forecast values is associated with the plurality of resources). The monitoring device determines, based on the plurality of sets of multi-step forecast values, a set of particular multi-step forecast values associated with the plurality of resources. In this way, by processing the plurality of sets of multi-step forecast values, the monitoring device determines a set of particular multi-step forecast values that are more accurate than a set of multi-step forecast values that are generated using any one machine learning model. For example, the monitoring device may process the plurality of sets of multi-step forecast values (e.g., using a voting technique and/or an averaging technique) to minimizes a likelihood that a non-preferred multi-step forecast value, such as one that is generated based on a spurious correlation of a machine learning model, is selected as a particular multi-step forecast value in the set of particular multi-step forecast values.

Accordingly, in some implementations, the monitoring device causes one or more actions to be performed, such as providing the set of particular multi-step forecast values for display, automatically adjusting of one or more operation parameters and/or one or more access parameters associated with at least one resource of the plurality of resources, and/or providing notifications and/or alerts associated with the set of particular multi-step forecast values. In this way, the monitoring device enables a user, or an automated process, to address an issue associated with the at least one resource (e.g., the at least one resource of the plurality of resource is operating in a non-preferred manner), which increases a likelihood that the issue is adequately addressed. This increases a likelihood that the at least one resource uses computing resources (e.g., processing resources, memory resources, communication resources, and/or power resources, among other examples) in an efficient manner.

Further, in some implementations, the monitoring device determines that a correlation exists between resources of the plurality of resources. Accordingly, going forward, the monitoring device may refrain from obtaining a data stream associated with a correlated resource and/or may reduce a number of machine learning models that are used when determining particular multi-step forecast values. In this way, the monitoring device reduces usage of computing resources (e.g., processing resources, memory resources, communication resources, and/or power resources, among other examples) that would otherwise have been expended to obtain the data stream and/or to process data stream using a superfluous machine learning model.

FIGS. 1A-1I are diagrams of one or more example implementations 100 described herein. Example implementation(s) 100 may include a monitoring device, a plurality of resources (shown as a plurality of resources 1 through N, where N is greater than or equal to 3), and/or a client device. The monitoring device, the plurality of resources, and/or the client device are described in more detail below in connection with FIGS. 3-5.

As shown in FIG. 1A, the monitoring device may be configured to monitor the plurality of resources. For example, the monitoring device may communicate with each resource of the plurality of resources (e.g., via a network) to monitor the plurality of resources. A resource may be a computing device, such as a router, memory, an Internet of things (IoT) device, and/or another device, that is capable of providing information related to the resource (e.g., status information related a state of the resource, a capacity of the resource, a usage of the resource, a temperature of the resource, and/or other parameters of the resource).

As shown by reference number 105, the monitoring device may obtain a plurality of data streams from the plurality of resources. In some implementations, the monitoring device may receive a plurality of time-series data streams respectively associated with the plurality of resources. For example, as shown in FIG. 1A, a resource 1 may send a data stream 1 that includes [$A_1, A_2, A_3, \ldots$], where $A_1$ is a value related to a parameter (e.g., a usage) of resource 1 at time 1, $A_2$ is a value related to the parameter of resource 1 at time 2, $A_3$ is a value related to the parameter of resource 1 at time 3, and/or so on. Accordingly, as further shown in FIG. 1A, resource 2 may send a data stream 2 that includes [$B_1, B_2, B_3, \ldots$], resource 3 may send a data stream 3 that includes [$C_1, C_2, C_3, \ldots$], and/or so on. In this way, the monitoring device may obtain the data stream 1, the data stream 2, the data stream 3, and/or so on.

Figure 1B:
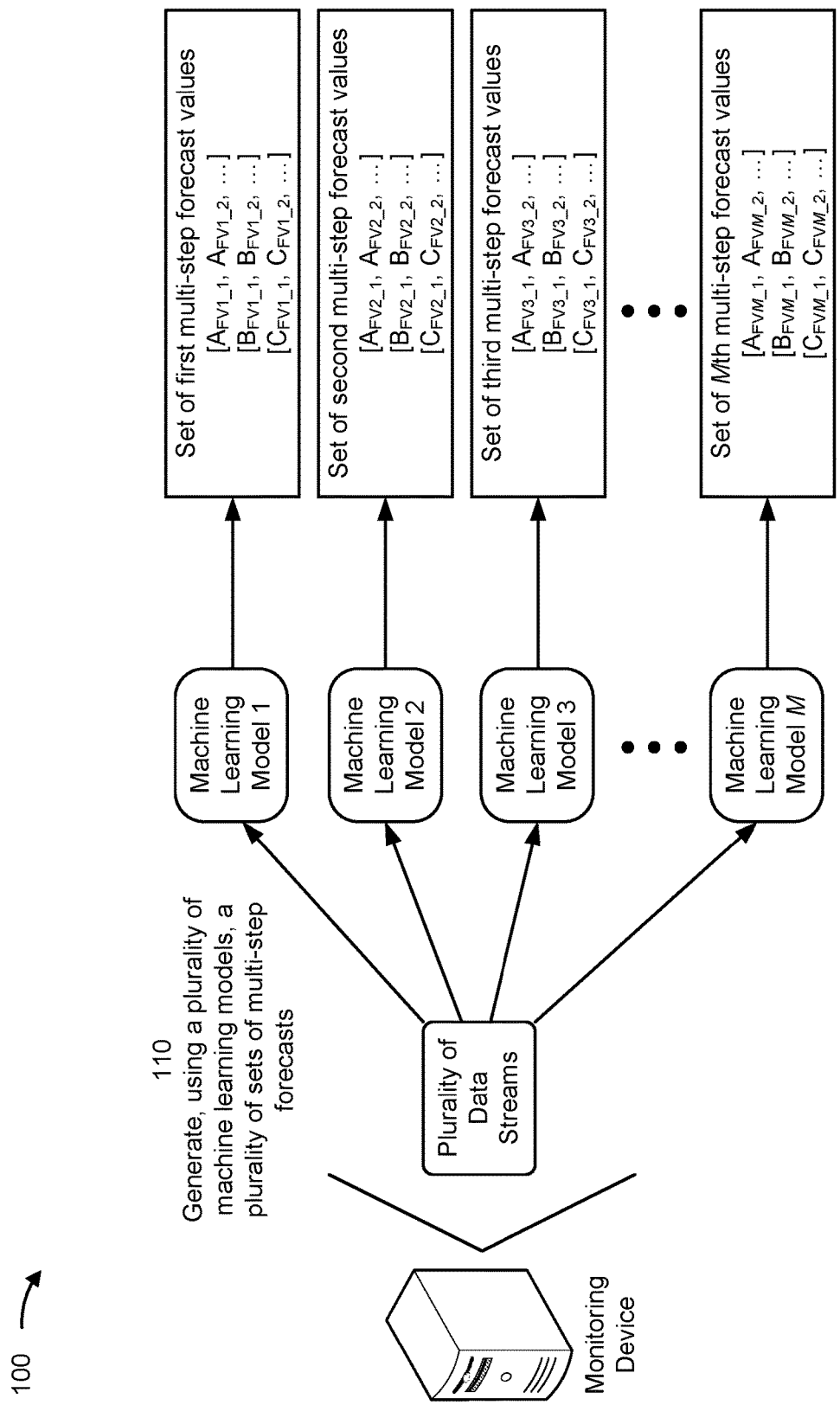

In some implementations, the monitoring device may identify a plurality of machine learning models (e.g., shown in FIG. 1B as machine learning models 1 through M, where M is greater than or equal to 3). Each machine learning model, of the plurality of machine learning models, may be a deep-learning machine learning model, such as a CNN model, an RNN model, an LSTM model, and/or another model. In some implementations, each machine learning model is a multivariate multiple parallel time-series based machine learning model. Each machine learning model may be trained to process a plurality of data streams to generate a set of multi-step forecasts. For example, each machine learning model may be trained to process a plurality of time-series data streams respectively associated with a plurality of resources (e.g., historic values of parameters respectively associated with the plurality of resources) to generate a set of multi-step forecast values associated with the plurality of resources (e.g., forecast values for the parameters respectively associated with the plurality of resources at multiple future moments in time). In some implementations, each machine learning model may be trained and/or used in a manner similar to that described below with respect to FIG. 2.

Each machine learning model, of the plurality of machine learning models, may be different from each other. For example, a first machine learning model (machine learning model 1 shown in FIG. 1B) may be trained using a first set of training data, a second machine learning model (machine learning model 2 shown in FIG. 1B) may be trained using a second set of training data, a third machine learning model (machine learning model 3 shown in FIG. 1B) may be trained using a third set of training data, and/or so on. At least some of the first set of training data and at least some of the second set of training data may not overlap with each other, at least some of the second set of training data and at least some of the third set of training data may not overlap with each other, at least some of the first set of training data and at least some of the third set of training data may not overlap with each other, and/or so on. That is, each machine learning model may be trained using similar, but different sets of training data. In this way, each machine learning model, as a result of being trained using a unique set of training data, may have a unique configuration.

As shown in FIG. 1B, and by reference number 110, the monitoring device may generate, using the plurality of machine learning models (e.g., by using the plurality of machine learning models to process the plurality of data streams), a plurality of sets of multi-step forecast values (e.g., wherein each set of multi-step forecast values is associated with the plurality of resources). For example, the monitoring device may generate, using the first machine learning model (e.g., machine learning model 1) and based on the plurality of time-series data streams (e.g., by using the first machine learning model to process the plurality of time-series data streams), a set of first multi-step forecast values (indicated by the subscript "FV1") associated with the plurality of resources that includes [$A_{FV1\_1}, A_{FV1\_2}, \ldots$] (e.g., a forecast value related to a parameter of resource 1 at time 1, a forecast value related to the parameter of resource 1 at time 2, and/or so on), [$B_{FV1\_1}$, $B_{FV1\_2}$, . . . ] (e.g., a forecast value related to a parameter of resource 2 at time 1, a forecast value related to the parameter of resource 2 at time 2, and/or so on), [$C_{FV1\_1}$, $CF_{V1\_2}$,] (e.g., a forecast value related to a parameter of resource 3 at time 1, a forecast value related to the parameter of resource 3 at time 2, and/or so on), and/or so on. Accordingly, the monitoring device may generate, using the second machine learning model (e.g., machine learning model 2) and based on the plurality of time-series data streams (e.g., by using the second machine learning model to process the plurality of time-series data streams), a set of second multi-step forecast values (indicated by the subscript "FV2") associated with the plurality of resources that includes [$A_{FV2\_1}$, $A_{FV2\_2}$, . . . ], [$BF_{V2\_1}$, $BF_{V2\_2}$, . . . ], [$C_{FV2\_1}$, $C_{FV2\_2}$, . . . ], and/or so on; may generate, using the third machine learning model (e.g., machine learning model 3) and based on the plurality of time-series data streams (e.g., by using the third machine learning model to process the plurality of time-series data streams), a set of third multi-step forecast values (indicated by the subscript "FV3") associated with the plurality of resources that includes [$A_{FV3\_1}$, $A_{FV3\_2}$, . . . ], [$B_{FV3\_1}$, $B_{FV3\_2}$, . . . ], [$C_{FV3\_1}$, $C_{FV3\_2}$, . . . ], and/or so on; and/or so on.

In some implementations, the monitoring device may generate the plurality of sets of multi-step forecast values based on different portions of the plurality of data streams. For example, each set of multi-step forecast values may be generated (e.g., using a corresponding machine learning model) based on a particular set of the plurality of data streams. As a specific example, with reference to the plurality of machine learning models shown in FIG. 1B, the set of first multi-step forecast values may be generated (e.g., using the first machine learning model) based on a first set of the plurality of time-series data streams, the set of second multi-step forecast values may be generated (e.g., using the second machine learning model) based on a second set of the plurality of time-series data streams, the set of third multi-step forecast values may be generated (e.g., using the third machine learning model) based on a third set of the plurality of time-series data streams, and/or so on. At least some of the first set of the plurality of time-series data streams and at least some of the second set of the plurality of time-series data streams may not overlap with each other, at least some of the second set of the plurality of time-series data streams and at least some of the third set of the plurality of time-series data streams may not overlap with each other, at least some of the first set of the plurality of time-series data streams and at least some of the third set of the plurality of time-series data streams may not overlap with each other, and/or so on. In this way, each set of multi-step forecast values, of the plurality of sets of multi-step forecast values, as determined by the monitoring device, has an increased likelihood of having unique multi-step forecast values (e.g., each set of multi-step forecast values is different than each other).

Figure 1C:
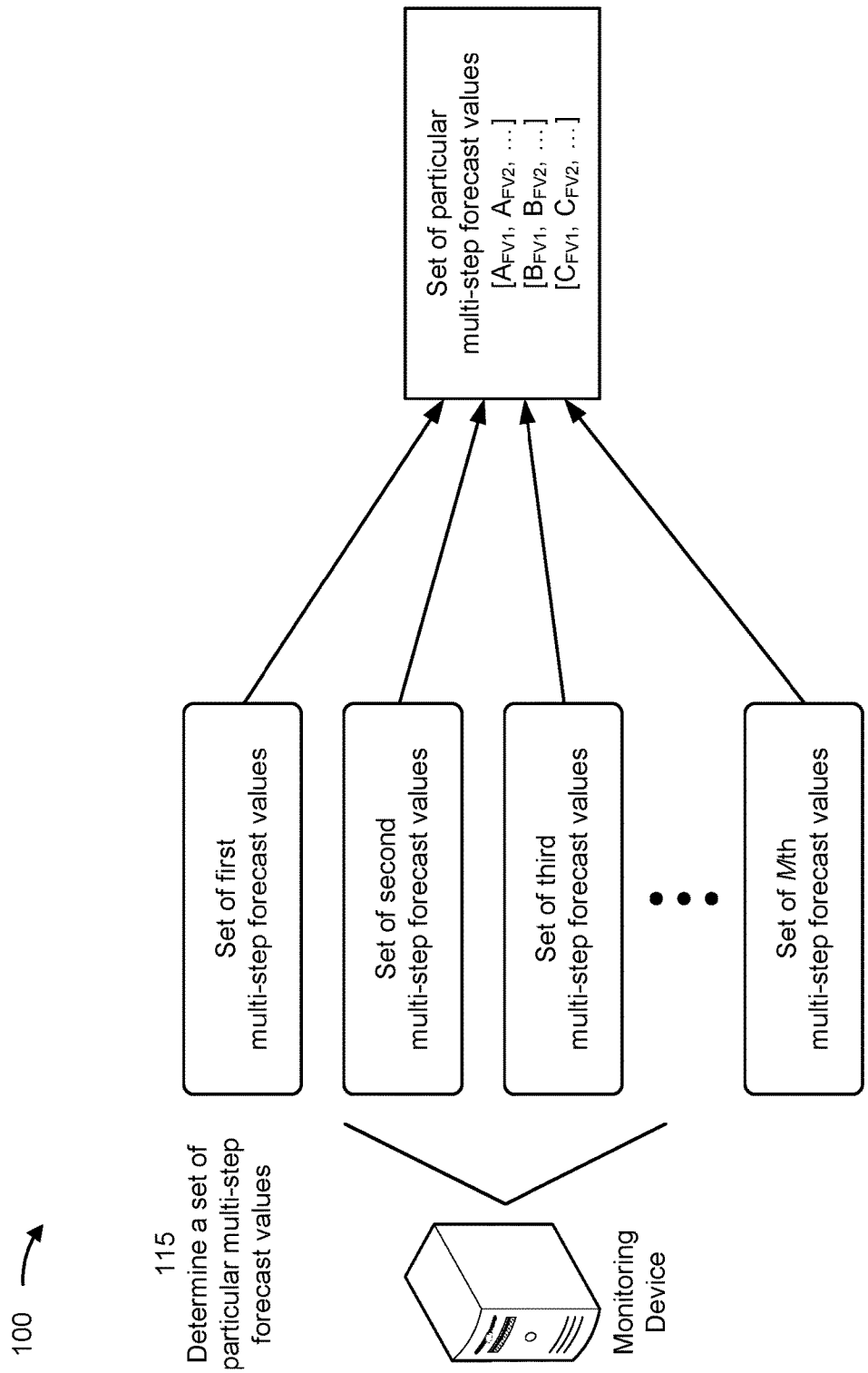

As shown in FIG. 1C, and by reference number 115, the monitoring device may determine, based on the plurality of sets of multi-step forecast values, a set of particular multi-step forecast values that are associated with the plurality of resources. For example, the monitoring device may determine, based on the set of first multi-step forecast values, the set of second multi-step forecast values, the set of third multi-step forecast values, and/or so on, a set of particular multi-step forecast values associated with the plurality of resources.

In some implementations, the monitoring device may determine the set of particular multi-step forecast values by selecting the set of particular multi-step forecast values from the plurality of sets of multi-step forecast values. For example, the monitoring device may select the set of particular multi-step forecast values from the set of first multi-step forecast values, the set of second multi-step forecast values, the set of third multi-step forecast values, and/or so on. Accordingly, a particular multi-step forecast value, of the set of particular multi-step forecast values, that is associated with a resource, of the plurality of resources, is selected from one of: a first multi-step forecast value, of the set of first multi-step forecast values, that is associated with the resource; a second multi-step forecast value, of the set of second multi-step forecast values, that is associated with the resource; a third multi-step forecast value, of the set of third multi-step forecast values, that is associated with the resource; and/or so on.

In some implementations, the monitoring device may use a voting technique (e.g., that uses a voting classifier) to select the set of particular multi-step forecast values. For example, the monitoring device may identify a set of the first multi-step forecast value, the second multi-step forecast value, the third multi-step forecast value, and/or so on, that are similar to each other (e.g., a difference between the multi-step forecast values are within a tolerance threshold) and may select the particular multi-step forecast value from the set (e.g., using one or more voting criteria). In this way, the monitoring device ignores any multi-step forecast value that is not similar to the other multi-step forecast values to determine the particular multi-step forecast value. This thereby minimizes a likelihood that a non-preferred multi-step forecast value, such as one that is generated based on a spurious correlation of a machine learning model, is selected as the particular multi-step forecast value.

In some implementations, the monitoring device may determine the set of particular multi-step forecast values by using an averaging technique (e.g., based on the plurality of sets of multi-step forecast values). For example, the monitoring device may identify a first multi-step forecast value, of the set of first multi-step forecast values, that is associated with a particular resource of the plurality of resources; may identify a second multi-step forecast value, of the set of second multi-step forecast values, that is associated with the particular resource; may identify a third multi-step forecast value, of the set of third multi-step forecast values, associated with the particular resource; and/or so on. The monitoring device may use an averaging technique (e.g., that includes computing a simple moving average, a weighted average, a median, a mean, or the like) on the first multi-step forecast value, the second multi-step forecast value, the third multi-step forecast value, and/or so on, to determine a particular multi-step forecast value associated with the particular resource (e.g., that is part of the set of particular multi-step forecast values). In this way, the monitoring device minimizes an impact of any non-preferred multi-step forecast value, such as one that is generated based on a spurious correlation of a machine learning model, in the determination of the particular multi-step forecast value.

Figure 1D:
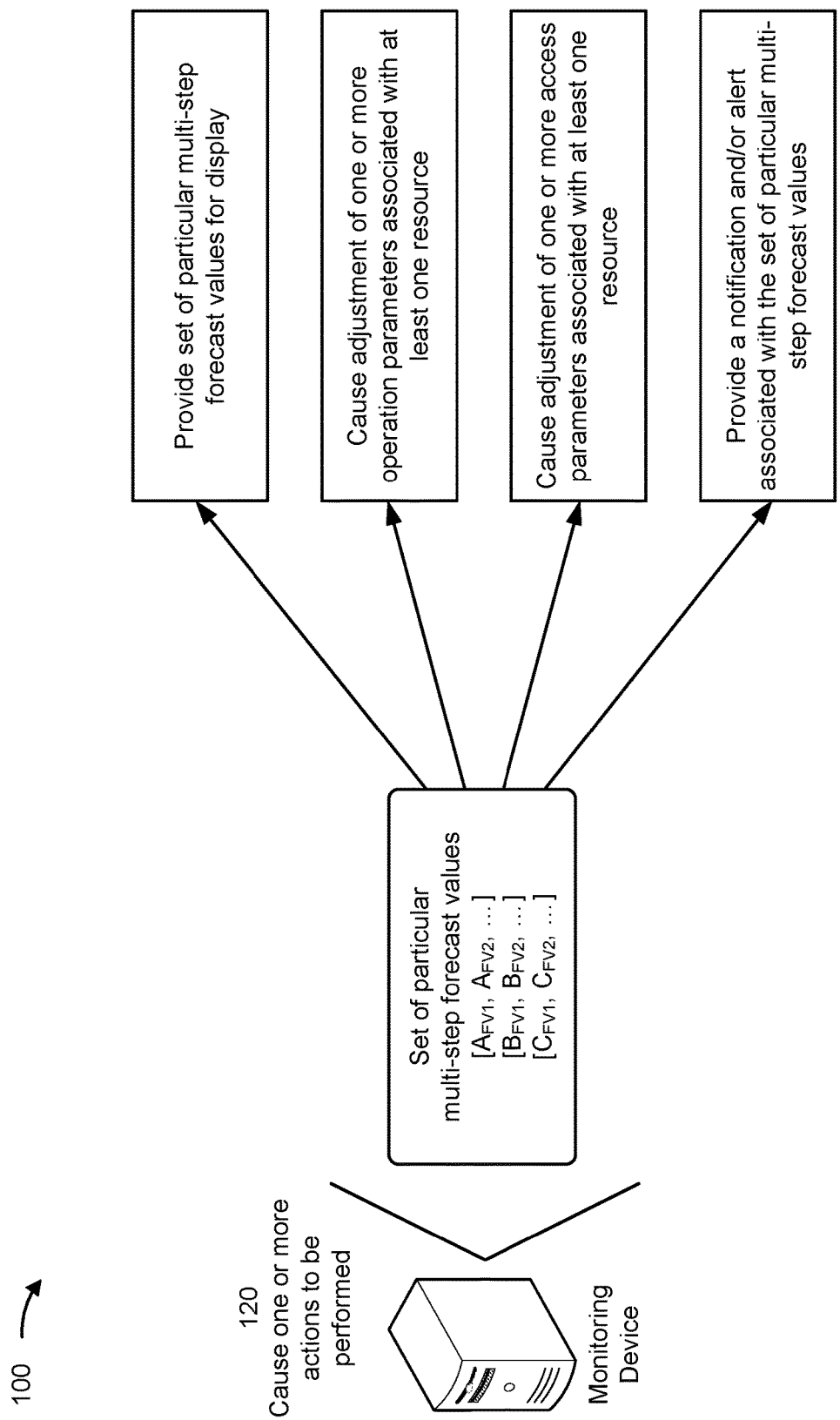

As shown in FIG. 1D, and by reference number 120, the monitoring device cause one or more actions to be performed (e.g., based on the set of particular multi-step forecast values). In some implementations, the one or more actions may include providing, to another device (e.g., the client device), the set of particular multi-step forecast values. This may permit the other device to display the set of particular multi-step forecast values on a display of the other device (e.g., via a graphical user interface of the display of the other device). In this way, the monitoring device may enable a user of the other device to view the particular multi-step forecast values.

In some implementations, the one or more actions may include adjustment of one or more operation parameters associated with at least one resource of the plurality of resources and/or adjustment of one or more access parameters associated with at least one resource of the plurality of resources. For example, the monitoring device may determine, based on the set of particular multi-step forecast values, that at least one resource of the plurality of resources is operating in a non-preferred manner and may send one or more instructions to the at least one resource to permit the at least one resource to adjust one or more operation parameters (e.g., a processor speed, a throughput, a bandwidth, a communication frequency, and/or another operation parameter) and/or to adjust one or more access parameters (e.g., to limit or increase an amount of devices that have access to the at least one resource). In this way, the monitoring device may enable the at least one resource to cease operating in the non-preferred manner and may increase a likelihood that the at least one resource operates in a preferred manner. This increases a likelihood that the at least one resource uses computing resources (e.g., processing resources, memory resources, communication resources, and/or power resources, among other examples) in an efficient manner.

In some implementations, the one or more actions may include providing a notification and/or an alert associated with the set of particular multi-step forecast values. For example, the monitoring device may generate a message (e.g., a notification message or an alert message) that includes information associated with the set of particular multi-step forecast values and may provide the message to another device (e.g., the client device). This may permit the other device to display the information on a display of the other device (e.g., as a notification or alert via a graphical user interface of the display of the other device). In this way, the monitoring device may enable a user, or an automated program, of the other device to be informed of the information and to take action to address an issue associated with the set of particular multi-step forecast values (e.g., an issue associated with operation of at least one resource of the plurality of resources). This increases a likelihood that the issue is adequately addressed, which increases a likelihood that the at least one resource uses computing resources (e.g., processing resources, memory resources, communication resources, and/or power resources, among other examples) in an efficient manner.

Figure 1E:
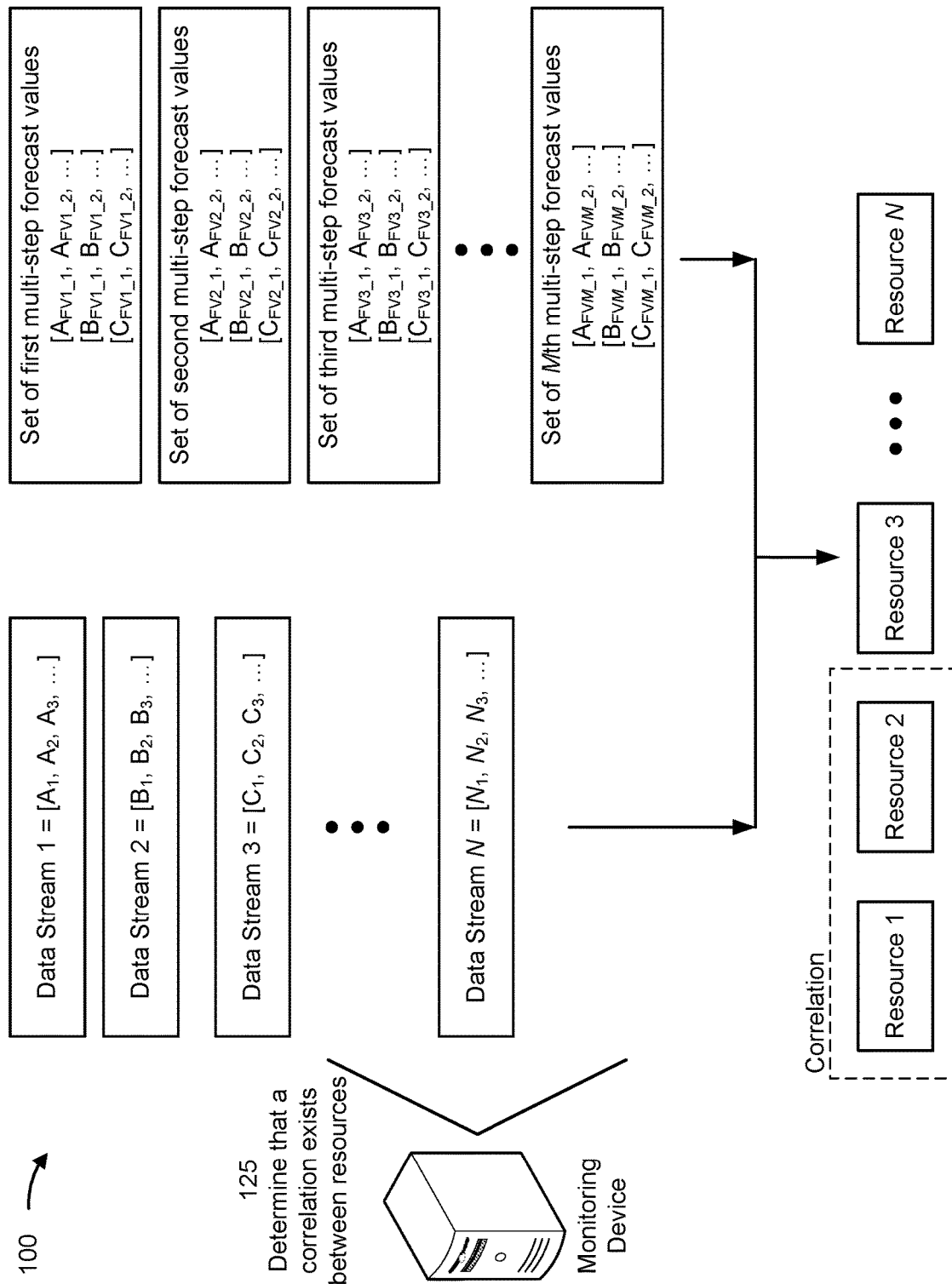

As shown in FIG. 1E, and by reference number 125, the monitoring device may determine that a correlation exists between resources of the plurality of resources (e.g., a correlation between at least a first resource and a second resource). The monitoring device may determine that the correlation exists based on the plurality of data streams (e.g., the plurality of time-series data streams), the plurality of sets of the multi-step forecast values, and/or the set of particular multi-step forecast values. For example, the monitoring device may determine, based on the plurality of time-series data streams, the set of first multi-step forecast values, the set of second multi-step forecast values, the set of third multi-step forecast values, and/or so on, that a correlation exists between a first resource and a second resource of the plurality of resources.

In a specific example, the monitoring device identify a first time-series data stream (e.g., $[A_1, A_2, A_3, \ldots]$ shown in FIG. 1E), of the plurality of time-series data streams, that is associated with a first resource (e.g., resource 1 shown in FIG. 1E) of the plurality of resources and may identify a second time-series data stream (e.g., $[B_1, B_2, B_3, \ldots]$ shown in FIG. 1E), of the plurality of time-series data streams, that is associated with a second resource (e.g., resource 2 shown in FIG. 1E) of the plurality of resources. The monitoring device may identify a first multi-step forecast value (e.g., $[A_{FV1\_1}, A_{FV1\_2}, \ldots]$ shown in FIG. 1E) of the set of first multi-step forecast values, associated with the first resource and another first multi-step forecast value (e.g., $[B_{FV1\_1}, B_{FV1\_2}, \ldots$ shown in FIG. 1E] associated with the second resource; may identify a second multi-step forecast value (e.g., $[A_{FV2\_1}, A_{FV2\_2}, \ldots]$ shown in FIG. 1E), of the set of second multi-step forecast values, associated with the first resource and another second multi-step forecast value (e.g., $[BF_{FV2\_1}, B_{FV2\_2}, \ldots]$ shown in FIG. 1E) associated with the second resource; may identify a third multi-step forecast value (e.g., $[A_{FV3\_1}, A_{FV3\_2}, \ldots]$ shown in FIG. 1E), of the set of third multi-step forecast values, associated with the first resource and another third multi-step forecast value (e.g., $[B_{FV3\_1}, B_{FV3\_2}, \ldots]$ shown in FIG. 1E) associated with the second resource; and/or so on. Accordingly, the monitoring device may process the first time-series data stream, the second time-series data stream, the first multi-step forecast value, the second multi-step forecast value, the third multi-step forecast value, and/or so on (e.g., using a correlation determination technique, such as Pearson correlation coefficient determination technique, a Spearman's rank correlation coefficient technique, and/or another technique) that a correlation exists between the first resource and the second resource. In some implementations, when the monitoring device determines that a correlation exists between the first resource and the second resource of the plurality of resources, the monitoring device may perform one or more of the processing steps described herein in relation to FIGS. 1F-1I.

In some implementations, the monitoring device may determine, because a correlation exists between the first resource and the second resource, that the monitoring device does not need to obtain (going forward) data streams from the first resource to determine a multi-step forecast value for the first resource (e.g., because the multi-step forecast value can be derived, based on a correlation relationship between the first resource and the second resource, from a multi-step forecast value determined for the second resource). Accordingly, as shown in FIG. 1F, the monitoring device may prevent the monitoring device from obtaining a data stream (e.g., a time-series data stream) from the first resource (e.g., resource 1 shown in FIG. 1F) and/or may drop a data stream that is provided by the first resource.

Figure 1F:
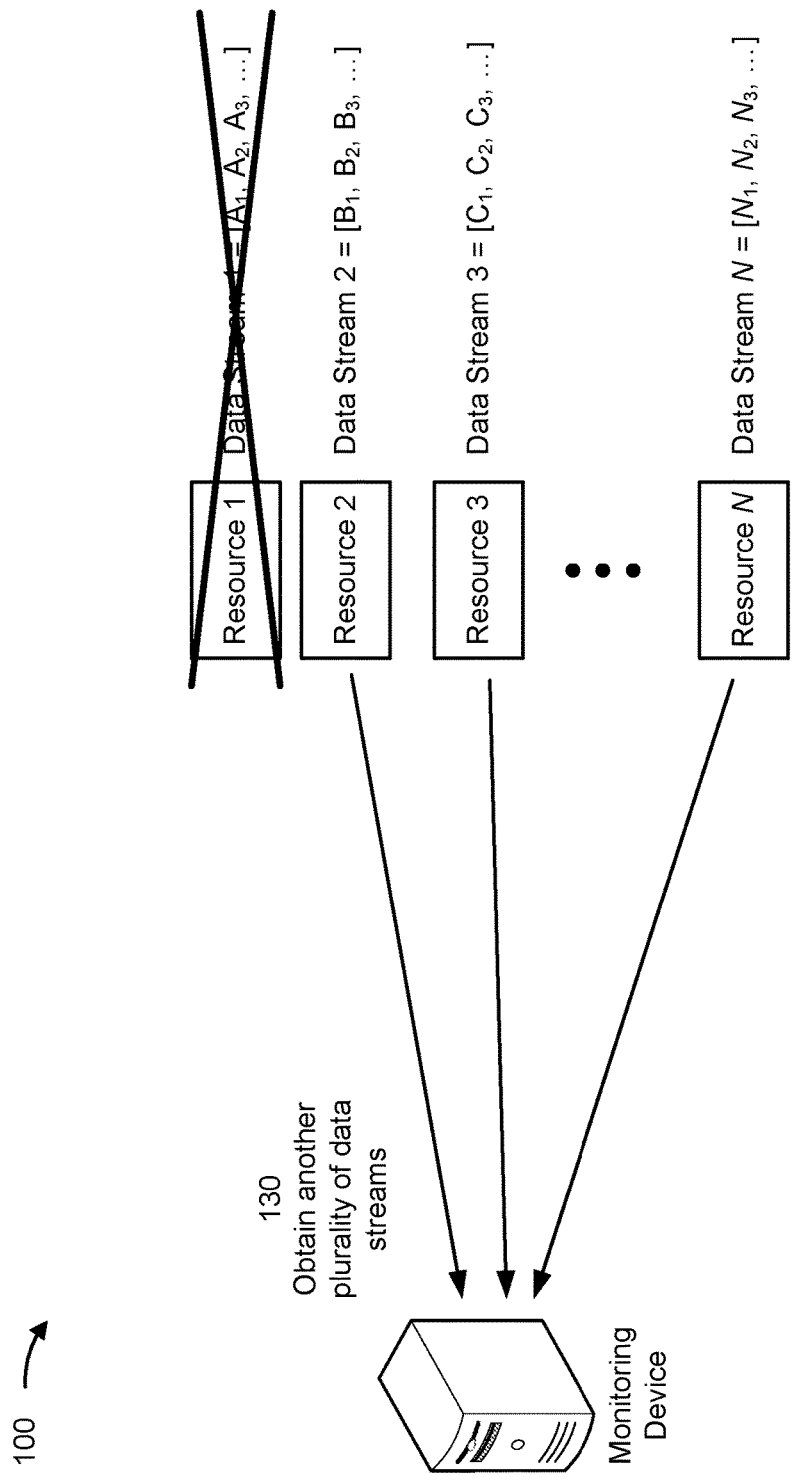

Accordingly, as further shown in FIG. 1F, and by reference number 130, the monitoring device may obtain another plurality of data streams from another plurality of resources (e.g., that includes the resources of the plurality of resources except the first resource), such as in a similar manner as that described herein in relation to FIG. 1A and reference number 105. For example, the monitoring device may obtain another plurality of time-series data streams (e.g., data streams 2 through N shown in FIG. 1F) respectively associated with the other plurality of resources (e.g., resources 2 through N shown in FIG. 1F).

Figure 1G:
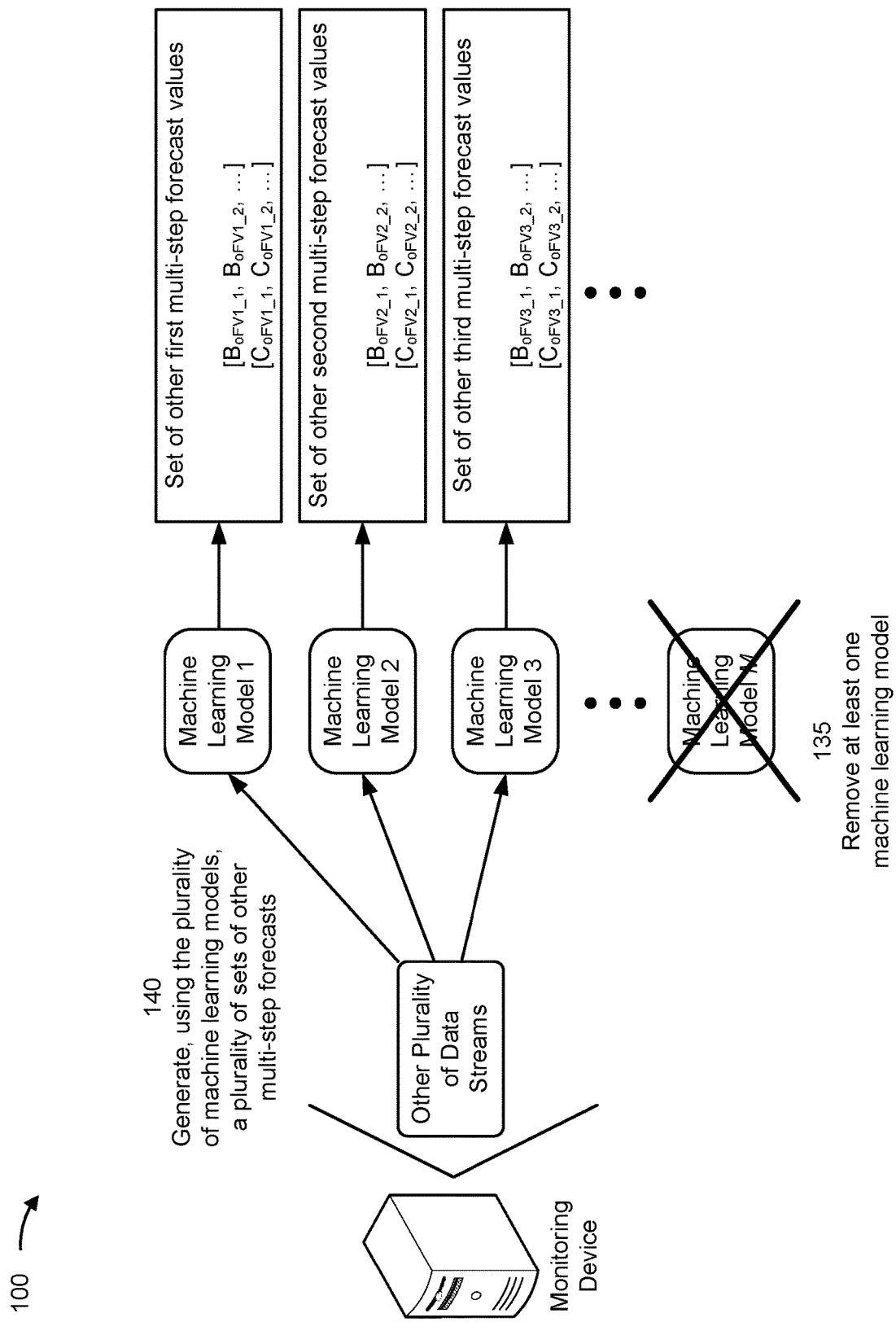

Additionally, or alternatively, as shown in FIG. 1G, and by reference number 135, the monitoring device may remove at least one machine learning model from the plurality of machine learning models (e.g., based on determining that the correlation exists between the first resource and the second resource). The monitoring device may remove the at least one machine learning model (e.g., machine learning model M shown in FIG. 1G) because the number of resources of the other plurality of resources is less than or equal to a threshold number of resources. In this way, the monitoring device may reduce an amount of computing resources (e.g., processing resources, memory resources, communication resources, and/or power resources, among other examples) that need to be utilized to generate the plurality of sets of other multi-step forecast values (described herein in relation to reference number 140).

As shown in FIG. 1G, and by reference number 140, the monitoring device may generate using the plurality of machine learning models (e.g., by using the machine learning models that remain in the plurality of machine learning models to process the other plurality of data streams), a plurality of sets of other multi-step forecast values (e.g., wherein each set of other multi-step forecast values is associated with the other plurality of resources). For example, the monitoring device may generate, using the first machine learning model (e.g., machine learning model 1) and based on the other plurality of time-series data streams (e.g., by using the first machine learning model to process the other plurality of time-series data streams), a set of other first multi-step forecast values (indicated by the subscript "oFV1") associated with the other plurality of resources that includes [$B_{oFV1\_1}$, $B_{oFV1\_2}$, . . . ] (e.g., a forecast value related to a parameter of resource 2 at time 1, a forecast value related to the parameter of resource 2 at time 2, and/or so on), [$C_{oFV1\_1}$, $C_{oFV1\_2}$,] (e.g., a forecast value related to a parameter of resource 3 at time 1, a forecast value related to the parameter of resource 3 at time 2, and/or so on), and/or so on. Accordingly, the monitoring device may generate, using the second machine learning model (e.g., machine learning model 2) and based on the plurality of other time-series data streams (e.g., by using the second machine learning model to process the other plurality of time-series data streams), a set of second multi-step forecast values (indicated by the subscript "oFV2") associated with the other plurality of resources that includes [$B_{oFV2\_1}$, $B_{oFV2\_2}$, . . . ], [$C_{oFV2\_1}$, $C_{oFV2\_2}$,], and/or so on; may generate, using the third machine learning model (e.g., machine learning model 3) and based on the plurality of other time-series data streams (e.g., by using the third machine learning model to process the other plurality of time-series data streams), a set of third multi-step forecast values (indicated by the subscript "oFV3") associated with the other plurality of resources that includes [$B_{oFV3\_1}$, $B_{oFV3\_2}$, . . . ], [$C_{oFV3\_1}$, $C_{oFV3\_2}$, . . . ], and/or so on; and/or so on. In some implementations, the monitoring device may generate the plurality of sets of other multi-step forecast values based on different portions of the other plurality of data streams, such as in a similar manner as that described herein in relation to FIG. 1B and reference number 110.

Figure 1H:
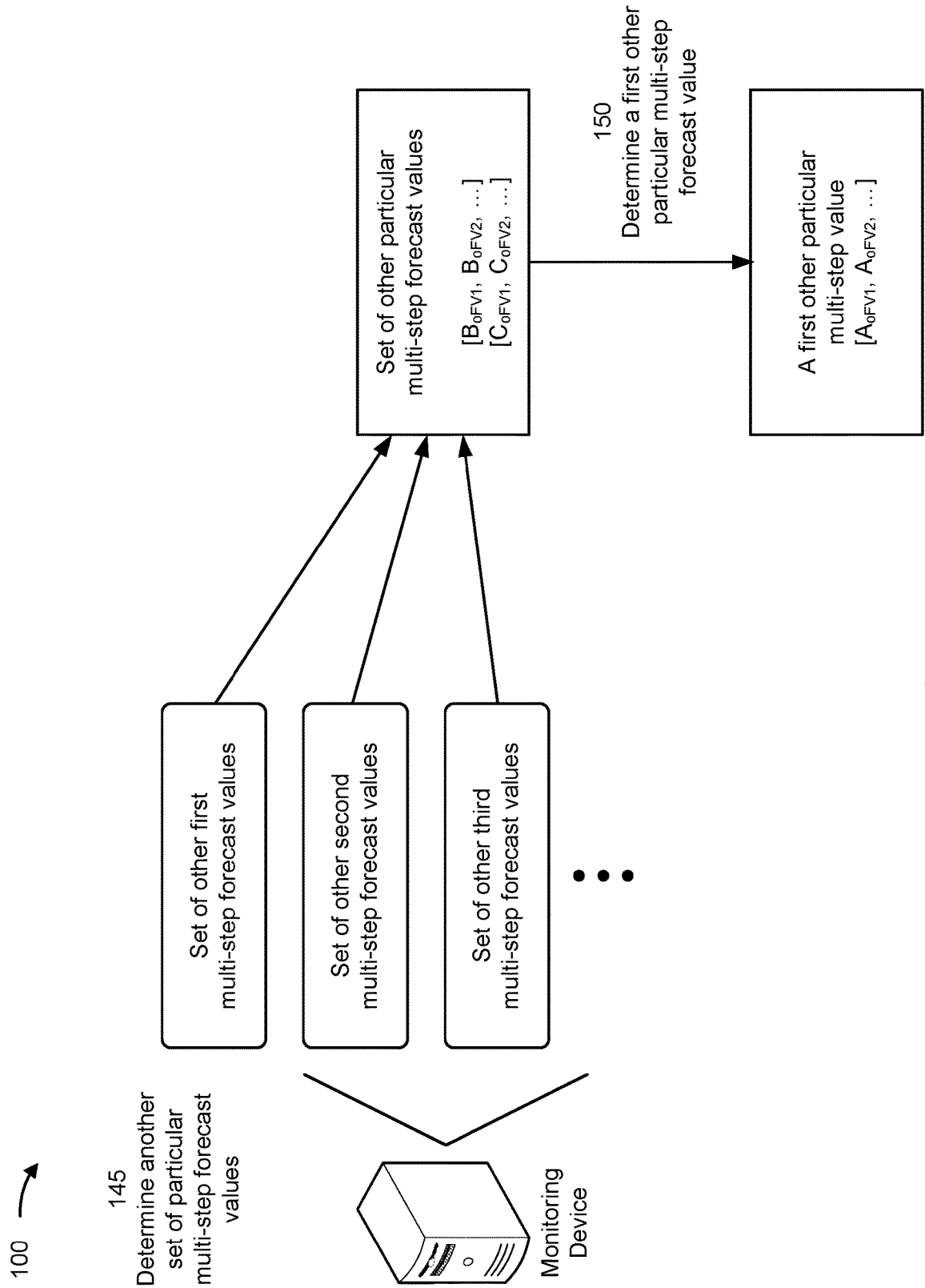

As shown in FIG. 1H, and by reference number 145, the monitoring device may determine, based on the plurality of sets of other multi-step forecast values, a set of other particular multi-step forecast values that are associated with the other plurality of resources. For example, the monitoring device may determine, based on the set of other first multi-step forecast values, the set of other second multi-step forecast values, the set of other third multi-step forecast values, and/or so on, a set of other particular multi-step forecast values associated with the other plurality of resources. In some implementations, the monitoring device may determine the set of other particular multi-step forecast values by selecting the set of other particular multi-step forecast values from the plurality of sets of other multi-step forecast values, or by using an averaging technique based on the plurality of other sets of multi-step forecast values, such as in a similar manner as that described herein in relation to FIG. 1C and reference number 115.

As shown by reference number 150, the monitoring device may determine a first other particular multi-step forecast value (e.g., that is associated with the first resource) based on the set of other particular multi-step forecast values. For example, the monitoring device may identify a correlation relationship between the first resource and the second resource (e.g., as part of determining that a correlation exists between the first resource and the second resource, as described herein in relation to FIG. 1E and reference number 125) and may determine the first other particular multi-step forecast value (e.g., [$A_{oFV1}$, $A_{oFV2}$, . . . ] shown in FIG. 1H) based on the particular multi-step forecast value in the set of other particular multi-step forecast values that is associated with the second resource (e.g., [$B_{oFV1}$, $B_{oFV2}$, . . . ] shown in FIG. 1H) and the correlation relationship.

Figure 1I:
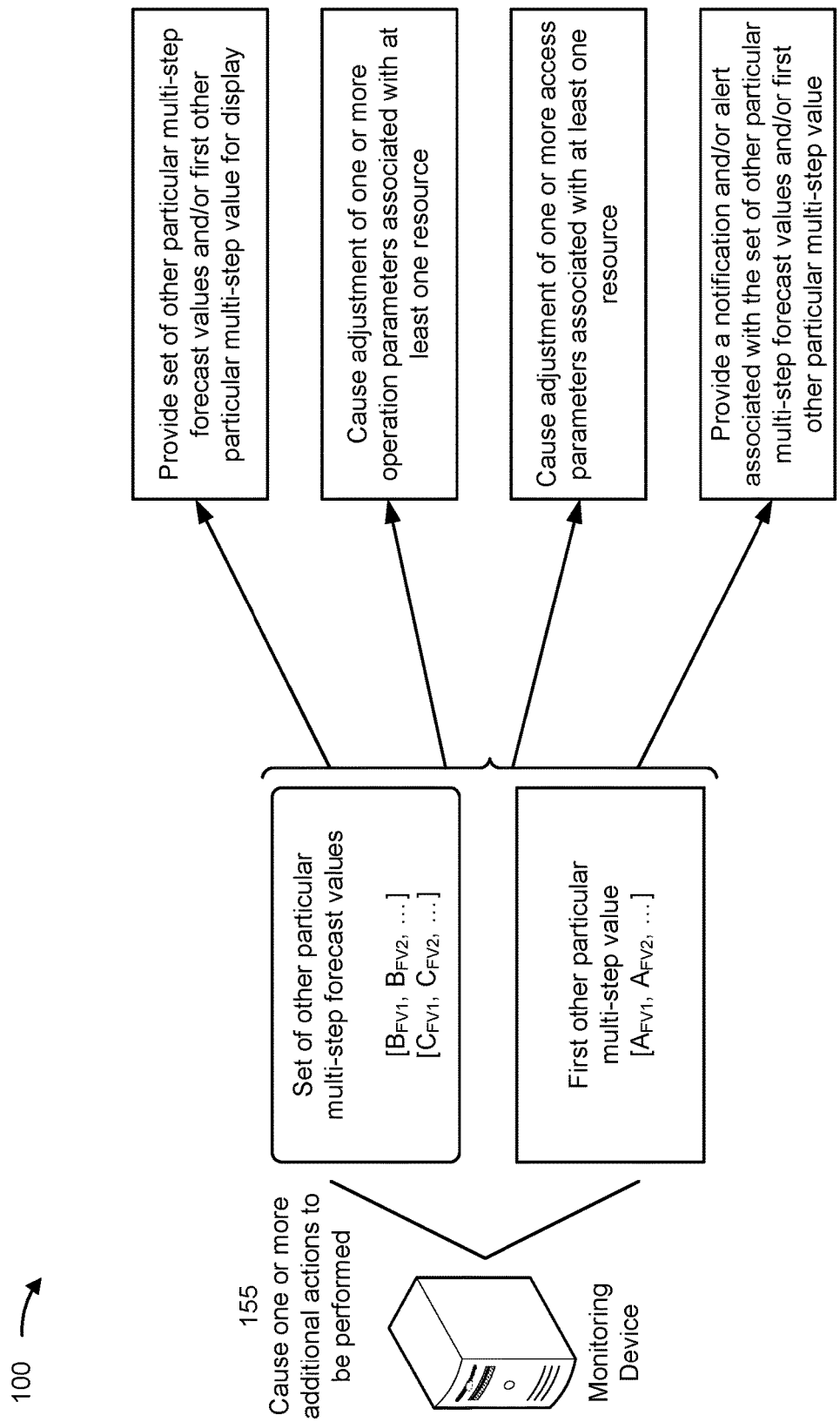

As shown in FIG. 1I, and by reference number 155, the monitoring device cause one or more additional actions to be performed (e.g., based on the set of other particular multi-step forecast values and/or the first other particular multi-step value). In some implementations, the one or more additional actions may include providing, to another device (e.g., the client device), the set of other particular multi-step forecast values and/or the first other particular multi-step value. This may permit the other device to display the set of other particular multi-step forecast values and/or the first other particular multi-step value on a display of the other device (e.g., via a graphical user interface of the display of the other device). In this way, the monitoring device may enable a user of the other device to view the set of other particular multi-step forecast values and/or the first other particular multi-step value.

In some implementations, the one or more additional actions may include adjustment of one or more operation parameters associated with at least one resource of the other plurality of resources and/or adjustment of one or more access parameters associated with at least one resource of the other plurality of resources. For example, the monitoring device may determine, based on the set of other particular multi-step forecast values and/or the first other particular multi-step value, that at least one resource of the other plurality of resource is operating in a non-preferred manner and may send one or more instructions to the at least one resource to permit the at least one resource to adjust one or more operation parameters (e.g., a processor speed, a throughput, a bandwidth, a communication frequency, and/or another operation parameter) and/or to adjust one or more access parameters (e.g., to limit or increase an amount of devices that have access to the at least one resource). In this way, the monitoring device may enable the at least one resource to cease operating in the non-preferred manner and may increase a likelihood that the at least one resource operates in a preferred manner. This increases a likelihood that the at least one resource uses computing resources (e.g., processing resources, memory resources, communication resources, and/or power resources, among other examples) in an efficient manner.

In some implementations, the one or more additional actions may include providing a notification and/or an alert associated with the set of other particular multi-step forecast values and/or the first other particular multi-step value. For example, the monitoring device may generate a message (e.g., a notification message or an alert message) that includes information associated with the set of other particular multi-step forecast values and/or the first other particular multi-step value and may provide the message to another device (e.g., the client device). This may permit the other device to display the information on a display of the other device (e.g., as a notification or alert via a graphical user interface of the display of the other device). In this way, the monitoring device may enable a user, or an automated program, of the other device to be informed of the information and to take action to address an issue associated with the set of other particular multi-step forecast values and/or the first other particular multi-step value (e.g., an issue association with operation of at least one resource of the other plurality of resources). This increases a likelihood that the issue is adequately addressed, which increases a likelihood that the at least one resource uses computing resources (e.g., processing resources, memory resources, communication resources, and/or power resources, among other examples) in an efficient manner.

As indicated above, FIGS. 1A-1I are provided as an example. Other examples may differ from what is described with regard to FIGS. 1A-1I.

Figure 2:
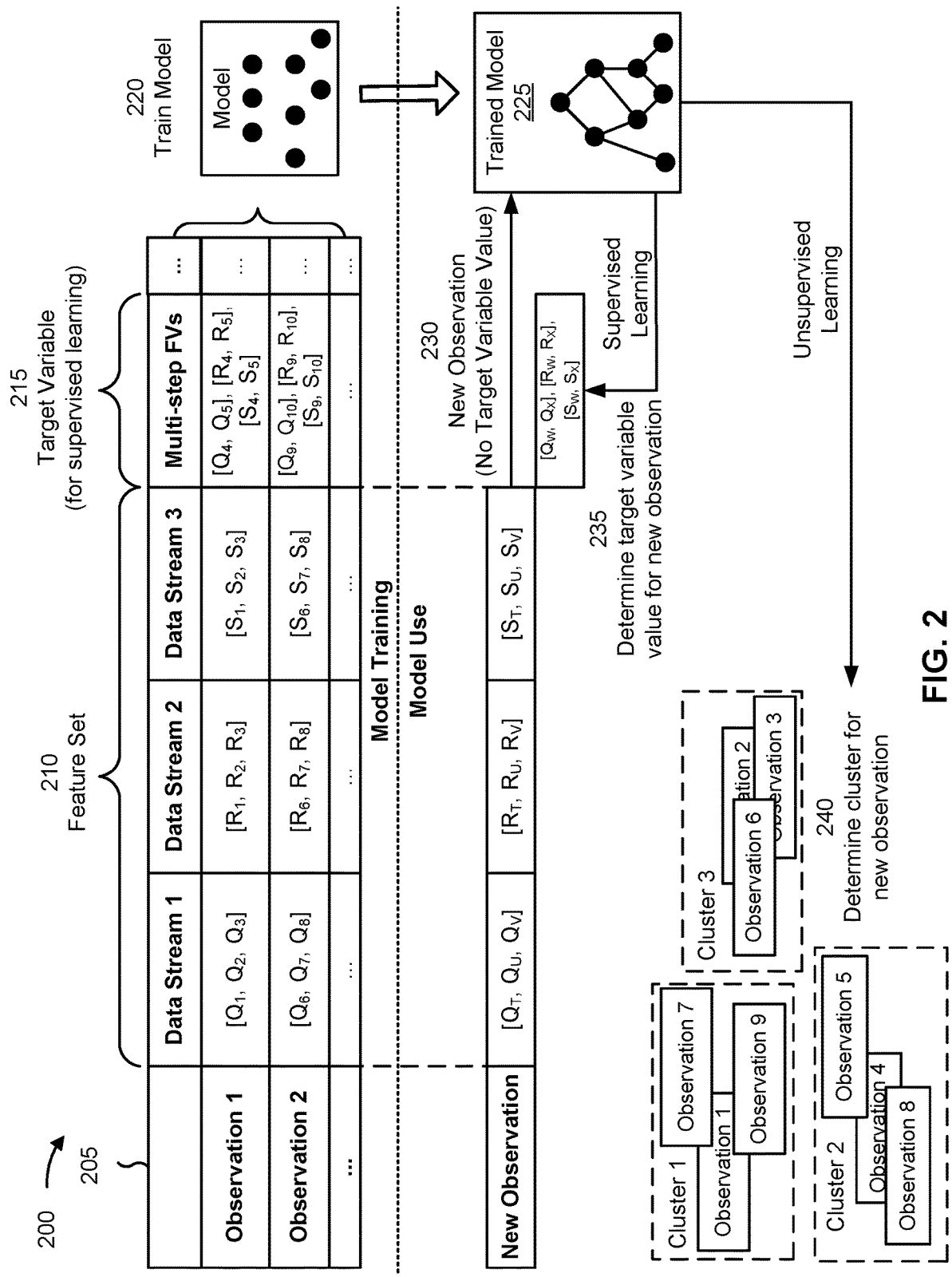
FIG. 2 is a diagram illustrating an example of training and using a machine learning model in connection with generating a set of multi-step forecast values associated with a plurality of resources.

FIG. 2 is a diagram illustrating an example 200 of training and using a machine learning model in connection with generating a set of multi-step forecast values associated with a plurality of resources. The machine learning model training and usage described herein may be performed using a machine learning system. The machine learning system may include or may be included in a computing device, a server, a cloud computing environment, or the like, such as the monitoring device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the monitoring device and/or the plurality of resources, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the monitoring device and/or the plurality of resources. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of data stream 1 (e.g., a time-series data stream 1), a second feature of data stream 2 (e.g., a time-series data stream 2), a third feature of data stream 3 (e.g., a time-series data stream 3), and so on. As shown, for a first observation, the first feature may have a value of $[Q_1, Q_2, Q_3]$, the second feature may have a value of $[R_1, R_2, R_3]$, the third feature may have a value of $[S_1, S_2, S_3]$, and/or so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a set of multi-step forecast values, which has a value of $[[Q_4, Q_5], [R_4, R_5], [S_4, S_5]]$ for the first observation.

The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, a CNN algorithm, an RNN algorithm, an LSTM algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of $[Q_T, Q_U, Q_V]$, a second feature of $[R_T, R_U, R_V]$, a third feature of $[S_T, S_U, S_V]$, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of $[[Q_W, Q_X], [R_W, R_X], [S_W, S_X]]$ for the target variable of set of multi-step forecast values for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, recommending providing an alert and/or notification. The first automated action may include, for example, causing adjustment of one or more operation parameters and/or one or more access parameters associated with at least one resource of the plurality of resources.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., non-preferred resource behavior), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include a set of actual values associated with the plurality of resources.

In this way, the machine learning system may apply a rigorous and automated process to generating a set of multi-step forecast values associated with a plurality of resources. The machine learning system enables recognition and/or identification of tens, hundreds, thousands, or millions of features and/or feature values for tens, hundreds, thousands, or millions of observations, thereby increasing accuracy and consistency and reducing delay associated with generating a set of multi-step forecast values associated with a plurality of resources relative to requiring computing resources to be allocated for tens, hundreds, or thousands of operators to manually generate a set of multi-step forecast values associated with a plurality of resources using the features or feature values.

As indicated above, FIG. 2 is provided as an example. Other examples may differ from what is described in connection with FIG. 2.

Figure 3:
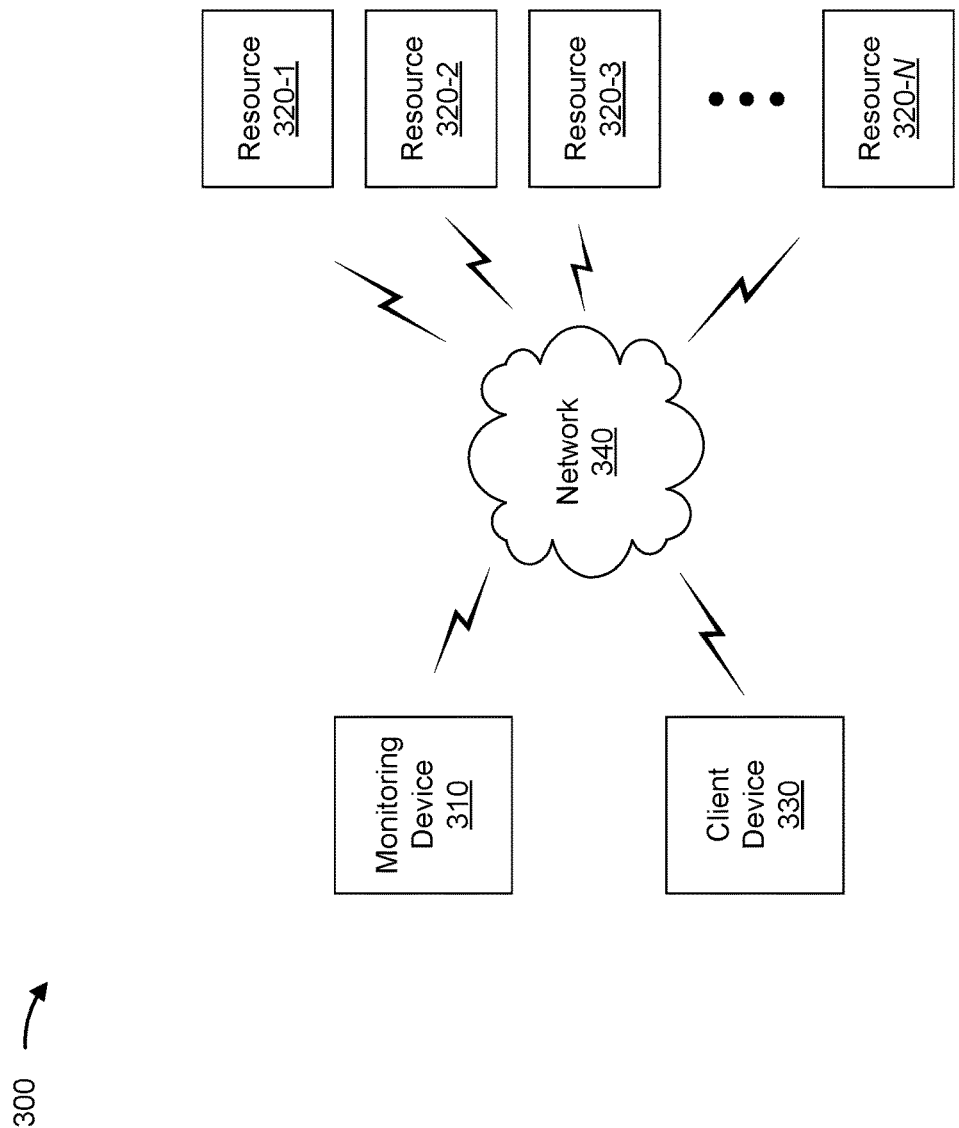
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a monitoring device 310, a plurality of resources 320 (shown as resources 320-1 through 320-N, where N is greater than or equal to 3), a client device 330, and a network 340. Devices of environment 300 may interconnect via wired connections and/or wireless connections.

The monitoring device 310 includes one or more devices capable of receiving, generating, storing, processing, providing, and/or routing information, as described elsewhere herein. The monitoring device 310 may include a communication device and/or a computing device. For example, the monitoring device 310 may include a server, such as an application server, a client server, a web server, a database server, a host server, a proxy server, a virtual server (e.g., executing on computing hardware), or a server in a cloud computing system. In some implementations, the monitoring device 310 includes computing hardware used in a cloud computing environment.

A resource 320 may include one or more wired or wireless devices capable of receiving, generating, storing, transmitting, processing, detecting, and/or providing information, as described elsewhere herein. The resource 320 may include a communication device and/or a computing device. For example, the monitoring device 310 may include a server, such as an application server, a client server, a web server, a database server, a host server, a proxy server, a virtual server (e.g., executing on computing hardware), or a server in a cloud computing system. As another example, the resource 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In another example, the resource 320 may include a temperature sensor, a moisture sensor, a humidity sensor, an accelerometer, a gyroscope, a proximity sensor, a light sensor, a noise sensor, a pressure sensor, an ultrasonic sensor, a smoke sensor, a gas sensor (e.g., a carbon monoxide sensor, an oxygen sensor, and/or a carbon dioxide sensor), a chemical sensor, an alcohol sensor, a positioning sensor, a capacitive sensor, a timing device, an infrared sensor, an active sensor (e.g., a sensor that requires an external power signal), a passive sensor (e.g., a sensor that does not require an external power signal), a biological sensor, a radioactive sensor, a magnetic sensor, an electromagnetic sensor, an analog sensor, and/or a digital sensor, among other examples.

The client device 330 may include one or more devices capable of receiving, generating, storing, processing, and/or providing information, as described elsewhere herein. The client device 330 may include a communication device and/or a computing device. For example, the client device 330 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 340 may include one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
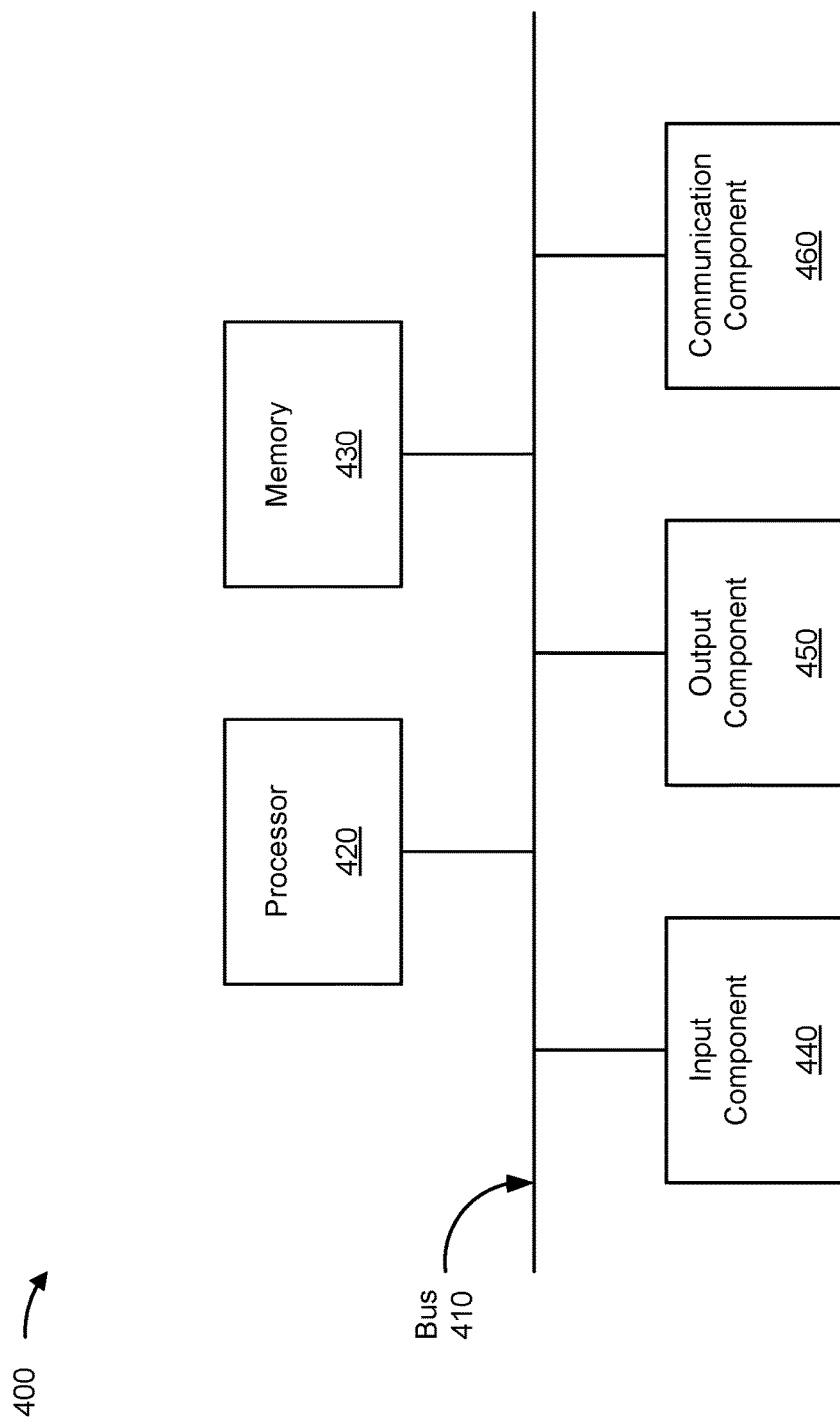
FIGS. 4 and 5 are diagrams of example components of one or more devices of FIG. 3.

FIG. 4 is a diagram of example components of a device 400 associated with improved accuracy of a multivariate approach for time-series based forecasting. Device 400 may correspond to monitoring device 310, resource 320, and/or client device 330. In some implementations, monitoring device 310, resource 320, and/or client device 330 may include one or more devices 400 and/or one or more components of device 400. As shown in FIG. 4, device 400 may include a bus 410, a processor 420, a memory 430, an input component 440, an output component 450, and a communication component 460.

Bus 410 may include one or more components that enable wired and/or wireless communication among the components of device 400. Bus 410 may couple together two or more components of FIG. 4, such as via operative coupling, communicative coupling, electronic coupling, and/or electric coupling. Processor 420 may include a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 may include one or more processors capable of being programmed to perform one or more operations or processes described elsewhere herein.

Memory 430 may include volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 may include one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
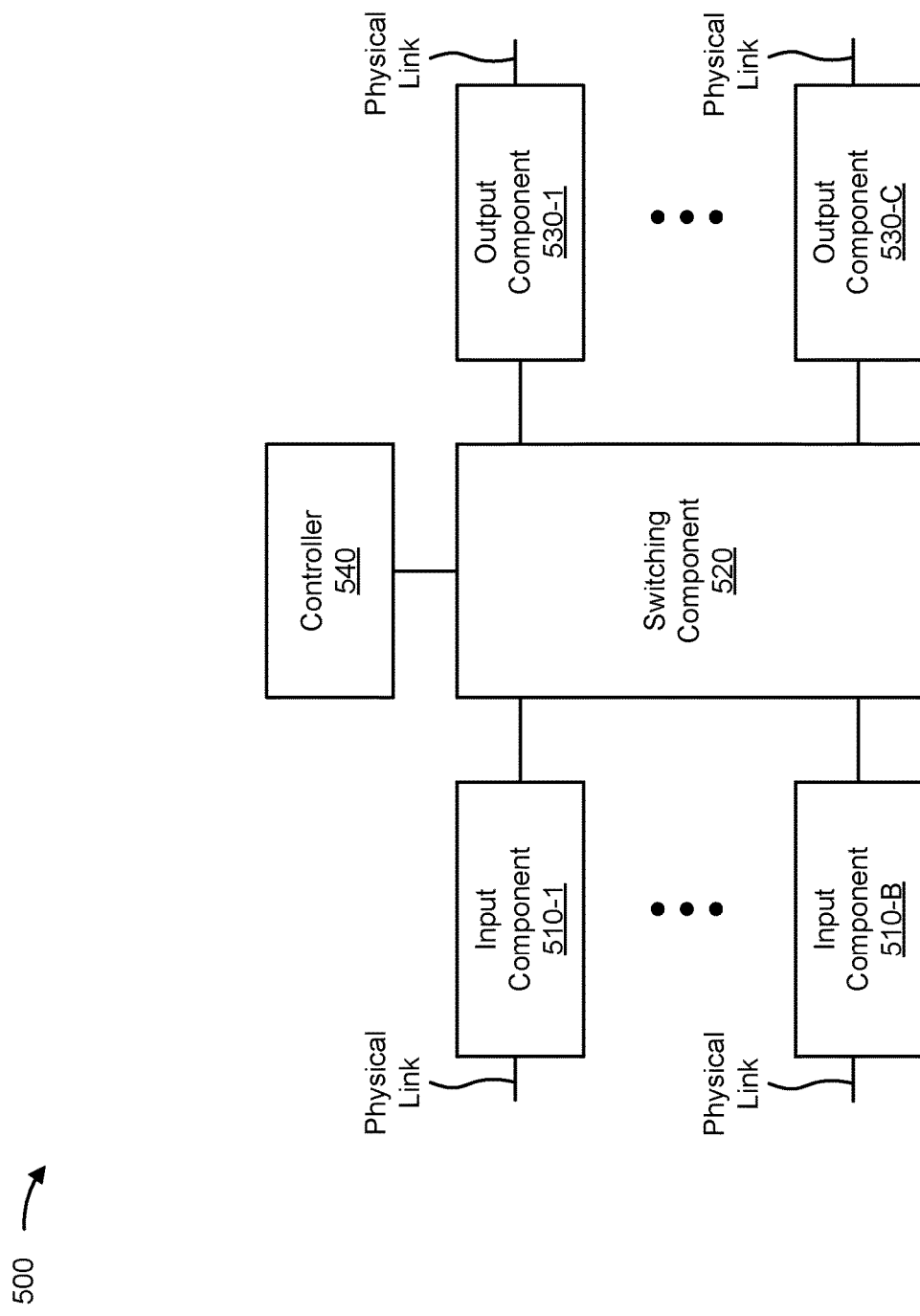

FIG. 5 is a diagram of example components of a device 500 associated with improved accuracy of a multivariate approach for time-series based forecasting. Device 500 may correspond to monitoring device 310, resource 320, and/or client device 330. In some implementations, monitoring device 310, resource 320, and/or client device 330 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
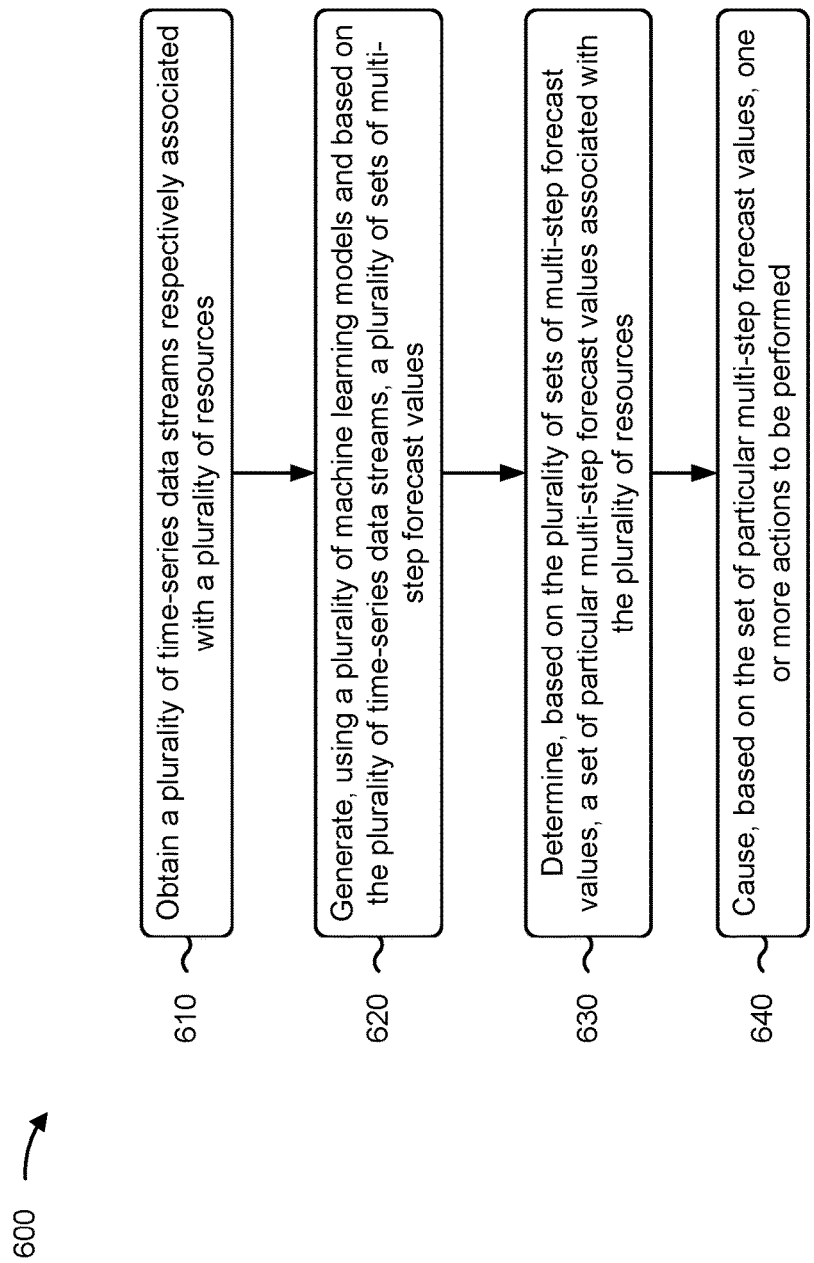
FIG. 6 is a flowchart of an example process associated with improved accuracy of a multivariate approach for time-series based forecasting.

FIG. 6 is a flowchart of an example process 600 associated with improved accuracy of a multivariate approach for time-series based forecasting. In some implementations, one or more process blocks of FIG. 6 are performed by a device (e.g., monitoring device 310). In some implementations, one or more process blocks of FIG. 6 are performed by another device or a group of devices separate from or including the device, such as a resource (e.g., resource 320) and/or a client device (e.g., client device 330). Additionally, or alternatively, one or more process blocks of FIG. 6 may be performed by one or more components of device 400, such as processor 420, memory 430, input component 440, output component 450, and/or communication component 460; one or more components of device 500, such as input component 510, switching component 520, output component 530, and/or controller 540; and/or one or more other components.

As shown in FIG. 6, process 600 may include obtaining a plurality of time-series data streams respectively associated with a plurality of resources (block 610). For example, the device may obtain a plurality of time-series data streams respectively associated with a plurality of resources, as described above.

As further shown in FIG. 6, process 600 may include generating, using a plurality of machine learning models and based on the plurality of time-series data streams, a plurality of sets of multi-step forecast values (block 620). For example, the device may generate, using a plurality of machine learning models and based on the plurality of time-series data streams, a plurality of sets of multi-step forecast values, as described above. In some implementations, each set of multi-step forecast values is associated with the plurality of resources.

As further shown in FIG. 6, process 600 may include determining, based on the plurality of sets of multi-step forecast values, a set of particular multi-step forecast values associated with the plurality of resources (block 630). For example, the device may determine, based on the plurality of sets of multi-step forecast values, a set of particular multi-step forecast values associated with the plurality of resources, as described above.

As further shown in FIG. 6, process 600 may include causing, based on the set of particular multi-step forecast values, one or more actions to be performed (block 640). For example, the device may cause, based on the set of particular multi-step forecast values, one or more actions to be performed, as described above.

Process 600 may include additional implementations, such as any single implementation or any combination of implementations described below and/or in connection with one or more other processes described elsewhere herein.

In a first implementation, process 600 includes determining, based on the plurality of time-series data streams and the plurality of sets of multi-step forecast values, that a correlation exists between a first resource and a second resource of the plurality of resources.

In a second implementation, alone or in combination with the first implementation, process 600 includes obtaining, based on determining that the correlation exists between the first resource and the second resource, another plurality of time-series data streams respectively associated with another plurality of resources, wherein the other plurality of resources includes the resources of the plurality of resources except the first resource; generating, using the plurality of machine learning models and based on the other plurality of time-series data streams, a plurality of sets of other multi-step forecast values, wherein each set of other multi-step forecast values is associated with the other plurality of resources; determining, based on the plurality of sets of other multi-step forecast values, a set of other particular multi-step forecast values associated with the other plurality of resources; determining, based on the set of other particular multi-step forecast values, a first other particular multi-step value associated with the first resource; and causing, based on the set of other particular multi-step forecast values and the first other particular multi-step value, one or more additional actions to be performed.

In a third implementation, alone or in combination with one or more of the first and second implementations, process 600 includes removing, based on determining that the correlation exists between the first resource and the second resource and prior to generating the plurality of other sets of multi-step forecast values, at least one machine learning model from the plurality of machine learning models, wherein the plurality of other sets of multi-step forecast values are generated using other machine learning models that remain in the plurality of machine learning models.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
   one or more memories; and
   one or more processors to:
   obtain a plurality of time-series data streams respectively associated with a plurality of resources;
   generate, using a first machine learning model and based on the plurality of time-series data streams, a set of first multi-step forecast values associated with the plurality of resources;
   generate, using a second machine learning model and based on the plurality of time-series data streams, a set of second multi-step forecast values associated with the plurality of resources;
   generate, using a third machine learning model and based on the plurality of time-series data streams, a set of third multi-step forecast values associated with the plurality of resources;
   determine, based on the set of first multi-step forecast values, the set of second multi-step forecast values, and the set of third multi-step forecast values, a set of particular multi-step forecast values associated with the plurality of resources; and
   cause, based on the set of particular multi-step forecast values, one or more actions to be performed, wherein the one or more actions include at least one of:
   adjustment of one or more operation parameters associated with at least one resource of the plurality of resources; or
   adjustment of one or more access parameters associated with at least one resource of the plurality of resources.

2. The device of claim 1, wherein each of the first machine learning model, the second machine learning model, and the third machine learning model is a multivariate multiple parallel time-series based machine learning model, wherein:
   the first machine learning model is trained using a first set of training data;

the second machine learning model is trained using a second set of the training data;

the third machine learning model is trained using a third set of the training data;

at least some of the first set and at least some of the second set do not overlap with each other;

at least some of the second set and at least some of the third set do not overlap with each other; and at least some of the first set and at least some of the third set do not overlap with each other.

3. The device of claim 1, wherein:

the set of first multi-step forecast values associated with the plurality of resources is generated, using the first machine learning model, based on a first set of the plurality of time-series data streams;

the set of second multi-step forecast values associated with the plurality of resources is generated, using the second machine learning model, based on a second set of the plurality of time-series data streams;

the set of third multi-step forecast values associated with the plurality of resources is generated, using the third machine learning model, based on a third set of the plurality of time-series data streams;

at least some of the first set and at least some of the second set do not overlap with each other;

at least some of the second set and at least some of the third set do not overlap with each other; and at least some of the first set and at least some of the third set do not overlap with each other.

4. The device of claim 1, wherein the one or more processors, to determine the set of particular multi-step forecast values, are to:

determine, using a voting technique and based on the set of first multi-step forecast values, the set of second multi-step forecast values, and the set of third multi-step forecast values, the set of particular multi-step forecast values.

5. The device of claim 1, wherein the one or more processors, to determine the set of particular multi-step forecast values, are to:

identify a first multi-step forecast value, of the set of first multi-step forecast values, associated with a particular resource of the plurality of resources;

identify a second multi-step forecast value, of the set of second multi-step forecast values, associated with the particular resource;

identify a third multi-step forecast value, of the set of third multi-step forecast values, associated with the particular resource; and determine, using an averaging technique and based on the first multi-step forecast value, the second multi-step forecast value, and the third multi-step forecast value, a particular multi-step forecast value associated with the particular resource, wherein the particular multi-step forecast value is part of the set of particular multi-step forecast values.

6. The device of claim 1, wherein the one or more processors, to cause the one or more actions to be performed, are to:

provide, to another device, the set of particular multi-step forecast values, wherein providing the set of particular multi-step forecast values is to permit the other device to display the set of particular multi-step forecast values on a display of the other device.

7. The device of claim 1, wherein the one or more processors are further to:

identify a first time-series data stream, of the plurality of time-series data streams, that is associated with a first resource of the plurality of resources;

identify a second time-series data stream, of the plurality of time-series data streams, that is associated with a second resource of the plurality of resources;

identify a first multi-step forecast value, of the set of first multi-step forecast values, associated with the first resource and another first multi-step forecast value associated with the second resource;

identify a second multi-step forecast value, of the set of second multi-step forecast values, associated with the first resource and another second multi-step forecast value associated with the second resource;

identify a third multi-step forecast value, of the set of third multi-step forecast values, associated with the first resource and another third multi-step forecast value associated with the second resource; and determine, based on the first time-series data stream, the second time-series data stream, the first multi-step forecast value, the second multi-step forecast value, and the third multi-step forecast value, that a correlation exists between the first resource and the second resource.

8. The device of claim 7, wherein the one or more processors are further to:

obtain, based on determining that the correlation exists between the first resource and the second resource, another plurality of time-series data streams respectively associated with another plurality of resources, wherein the other plurality of resources includes the resources of the plurality of resources except the first resource;

generate, using the first machine learning model and based on the other plurality of time-series data streams, a set of other first multi-step forecast values associated with the other plurality of resources;

generate, using the second machine learning model and based on the other plurality of time-series data streams, a set of other second multi-step forecast values associated with the other plurality of resources;

generate, using the third machine learning model and based on the other plurality of time-series data streams, a set of other third multi-step forecast values associated with the other plurality of resources;

determine, based on the set of other first multi-step forecast values, the set of other second multi-step forecast values, and the set of other third multi-step forecast values, a set of other particular multi-step forecast values associated with the other plurality of resources;

determine, based on the set of other particular multi-step forecast values, a first other particular multi-step value associated with the first resource; and cause, based on the set of other particular multi-step forecast values and the first other particular multi-step value, one or more additional actions to be performed.

9. The device of claim 1, wherein each of the plurality of time-series data streams are associated with different one of the plurality of resources.

10. The device of claim 1, wherein each of the plurality of sets of multi=step forecasts are generated from a different machine learning model.

11. A non-transitory computer-readable medium storing a set of instructions, the set of instructions comprising:

one or more instructions that, when executed by one or more processors of a device, cause the device to:

obtain a plurality of time-series data streams respectively associated with a plurality of resources;
generate, using three machine learning models and based on the plurality of time-series data streams, a set of first multi-step forecast values associated with the plurality of resources, a set of second multi-step forecast values associated with the plurality of resources, and a set of third multi-step forecast values associated with the plurality of resources;
determine, based on the set of first multi-step forecast values, the set of second multi-step forecast values, and the set of third multi-step forecast values, a set of particular multi-step forecast values associated with the plurality of resources; and
cause, based on the set of particular multi-step forecast values, one or more actions to be performed, wherein the one or more actions include at least one of:
adjustment of one or more operation parameters associated with at least one resource of the plurality of resources; or
adjustment of one or more access parameters associated with at least one resource of the plurality of resources.

12. The non-transitory computer-readable medium of claim 11, wherein the three machine learning models are different from each other.

13. The non-transitory computer-readable medium of claim 11, wherein the one or more instructions, that cause the device to determine the set of particular multi-step forecast values, cause the device to:
select the set of particular multi-step forecast values from the set of first multi-step forecast values, the set of second multi-step forecast values, and the set of third multi-step forecast values,
wherein a particular multi-step forecast value, of the set of particular multi-step forecast values, that is associated with a resource, of the plurality of resources, is selected from one of:
a first multi-step forecast value, of the set of first multi-step forecast values, that is associated with the resource;
a second multi-step forecast value, of the set of second multi-step forecast values, that is associated with the resource; and
a third multi-step forecast value, of the set of third multi-step forecast values, that is associated with the resource.

14. The non-transitory computer-readable medium of claim 11, wherein the one or more instructions, that cause the device to cause the one or more actions to be performed, cause the device to:
generate a message that includes information associated with the set of particular multi-step forecast values; and
provide, to another device, the message,
wherein providing the message is to permit a user of the other device to be informed of the information associated with the set of particular multi-step forecast values.

15. The non-transitory computer-readable medium of claim 11, wherein the one or more instructions, when executed by the one or more processors, further cause the device to:
determine, based on the plurality of time-series data streams, the set of first multi-step forecast values, the set of second multi-step forecast values, and the set of third multi-step forecast values, that a correlation exists between a first resource and a second resource of the plurality of resources.

16. The non-transitory computer-readable medium of claim 15, wherein the one or more instructions, when executed by the one or more processors, further cause the device to:
obtain, based on determining that the correlation exists between the first resource and the second resource, another plurality of time-series data streams respectively associated with another plurality of resources,
wherein the other plurality of resources includes the resources of the plurality of resources except the first resource;
generate, using the three machine learning models and based on the other plurality of time-series data streams, a set of other first multi-step forecast values associated with the other plurality of resources, a set of other second multi-step forecast values associated with the other plurality of resources, and a set of other third multi-step forecast values associated with the plurality of resources;
determine, based on the set of other first multi-step forecast values, the set of other second multi-step forecast values, and the set of other third multi-step forecast values, a set of other particular multi-step forecast values associated with the other plurality of resources;
determine, based on the set of other particular multi-step forecast values, a first other particular multi-step value associated with the first resource; and
cause, based on the set of other particular multi-step forecast values and the first other particular multi-step value, one or more additional actions to be performed.

17. The non-transitory computer-readable medium of claim 16, wherein the one or more instructions, that cause the device to cause the one or more additional actions to be performed, cause the device to:
provide, to another device, the set of other particular multi-step forecast values and the first other particular multi-step value,
wherein providing the set of other particular multi-step forecast values and the first other particular multi-step value is to permit the other device to display the set of other particular multi-step forecast values and the first other particular multi-step value on a display of the other device.

18. A method, comprising:
obtaining a plurality of time-series data streams respectively associated with a plurality of resources;
generating, using a plurality of machine learning models and based on the plurality of time-series data streams, a plurality of sets of multi-step forecast values,
wherein each set of multi-step forecast values is associated with the plurality of resources;
determining, based on the plurality of sets of multi-step forecast values, a set of particular multi-step forecast values associated with the plurality of resources;
determining, based on the plurality of time-series data streams and the plurality of sets of multi-step forecast values, that a correlation exists between a first resource and a second resource of the plurality of resources; and
causing, based on the set of particular multi-step forecast values, one or more actions to be performed.

19. The method of claim 18, further comprising:
obtaining, based on determining that the correlation exists between the first resource and the second resource, another plurality of time-series data streams respectively associated with another plurality of resources,
wherein the other plurality of resources includes the resources of the plurality of resources except the first resource;
generating, using the plurality of machine learning models and based on the other plurality of time-series data streams, a plurality of sets of other multi-step forecast values,
wherein each set of other multi-step forecast values is associated with the other plurality of resources;
determining, based on the plurality of sets of other multi-step forecast values, a set of other particular multi-step forecast values associated with the other plurality of resources;
determining, based on the set of other particular multi-step forecast values, a first other particular multi-step value associated with the first resource; and
causing, based on the set of other particular multi-step forecast values and the first other particular multi-step value, one or more additional actions to be performed.

20. The method of claim 19, further comprising:
removing, based on determining that the correlation exists between the first resource and the second resource and prior to generating the plurality of other sets of multi-step forecast values, at least one machine learning model from the plurality of machine learning models,
wherein the plurality of other sets of multi-step forecast values are generated using other machine learning models that remain in the plurality of machine learning models.

\* \* \* \* \*